United States Patent [19]
Miyasaka

[11] Patent Number: 4,665,804
[45] Date of Patent: May 19, 1987

[54] VENTILATOR NOZZLE STRUCTURE FOR AUTOMOTIVE VEHICLE

[75] Inventor: Masashi Miyasaka, Ebina, Japan

[73] Assignee: Nissan Motor Co., Ltd., Japan

[21] Appl. No.: 797,005

[22] Filed: Nov. 12, 1985

[30] Foreign Application Priority Data

Nov. 26, 1984 [JP] Japan ................... 59-247977

[51] Int. Cl.⁴ .................. B60H 1/34; F24F 13/15
[52] U.S. Cl. .......................... 98/2; 98/40.02; 98/40.27; 98/40.28
[58] Field of Search ............ 98/2, 40.02, 40.24, 98/40.27, 40.28, 110, 121.2

[56] References Cited

U.S. PATENT DOCUMENTS

| 3,301,164 | 1/1967 | Eberhart | 98/40.24 |
| 3,680,470 | 8/1972 | Neece | 98/110 |

FOREIGN PATENT DOCUMENTS

| 2814191 | 10/1979 | Fed. Rep. of Germany | 98/2 |
| 18011 | 1/1984 | Japan | 98/2 |
| 1375823 | 11/1974 | United Kingdom | 98/40.26 |

Primary Examiner—Harold Joyce
Attorney, Agent, or Firm—Leydig, Voit & Mayer

[57] ABSTRACT

A control knob is mounted on adjacent two stationary fins in such a manner as to be movable leftward and rightward in parallel to the stationary fins and connected to movable fins in such a manner that leftward and right movement of the control knob in parallel to the stationary fins causes rotation of the movable fins.

4 Claims, 7 Drawing Figures

VENTILATOR NOZZLE STRUCTURE FOR AUTOMOTIVE VEHICLE

BACKGROUND OF THE INVENTION

1. Field of the Invention

The present invention relates in general to ventilators for automotive vehicles and more particularly to ventilator nozzles thereof.

2. Description of the Prior Art

Passenger cars and other automotive vehicles, as shown in FIG. 4, have various ventilators 2 built in an instrument panel 1 for discharging fresh or conditioned air into a compartment through ventilator nozzles which are constructed as for example disclosed in the Japanese Provisional Patent Publication No. 58-214409 and also shown in FIGS. 5 and 6.

Referring to FIGS. 4 to 6, a prior art ventilator nozzle structure mainly consists of a housing 3 adapted to be installed on the instrument panel 1 and a louver 4 pivotally mounted on the housing 3. The louver 4 consists of a louver main body 6 having a plurality of horizontal parallel stationary fins 7 and a plurality of vertical parallel movable fins 8 pivotally mounted at 9a, 9b on the louver main body 6 which is in turn pivotally mounted at 12a, 12b on the housing 3. The movable fins 8 are connected at 15 by a connecting rod 14 so that horizontal movement of a control knob 5 attached to one of the movable fins 8 causes the movable fins 8 to turn leftwardly and rightwardly at the same time in the same direction. Up-and-down movement of the control knob 5 causes the louver 6 to turn upwardly and downwardly relative to the housing 3.

With the above arrangement, by turning the control knob 5 the ventilator nozzle can be turned to change the direction of airflow as desired.

A disadvantage of the above described ventilator nozzle structure is that the control knob 5 projects a considerable amount from the louver 4 when it is held at an intermediate position thereof, i.e., a position intermediate between maximumly rightward and leftward turned positions, resulting in a poor appearance of the ventilator as well as a tendency that some operations of a driver or passenger are obstructed by the control knob, since, as shown in FIG. 7, the control knob 5 is adapted to turn about the pivot 9a of the movable fin 8 and projects maximumly when held at the intermediate position and minimumly when at the maximumly positions and requires to project a certain amount that is large enough to be picked up between fingers even when it is turned maximumly to the left or right.

SUMMARY OF THE INVENTION

In accordance with the present invention, there is provided a novel and improved ventilator nozzle structure for a motor vehicle which comprises a stationary housing, a louver rotatably mounted in the housing and having a louver main body and a plurality of movable parallel fins rotatably mounted on the louver main body, the louver main body having a plurality of stationary parallel fins disposed transverse to the movable fins, a control knob, means for mounting the control knob on one of the stationary fins in such a manner that the control knob is movable relative to the one stationary fin in a first pair of opposite directions parallel to same and movable together with the one movable fin in a second pair of opposite directions transverse to the first pair of opposite directions for turning the louver, and means for connecting the control knob to the movable fins in such a manner that movement of the control knob in the first pair of opposite directions causes rotation of the movable fins.

The above structure is quite effective for overcoming the disadvantages and shortcomings inherent in the prior art devices.

It is accordingly an object of the present invention to provide a novel and improved ventilator nozzle structure for an automotive vehicle which can reduce the projecting amount of a control knob at an intermediate position thereof for thereby improving the appearance of a ventilator and obviating the tendency that some operations of a driver or passenger are obstructed by the control knob.

It is another object of the present invention to provide a novel and improved ventilator nozzle structure of the above mentioned character which can attain smooth and reliable movement of the control knob.

BRIEF DESCRIPTION OF THE DRAWINGS

The features and advantages of the ventilator nozzle structure according to the present invention will become more clearly appreciated from the following description taken in conjunction with the accompanying drawings, in which.

DETAILED DESCRIPTION OF THE PREFERRED EMBODIMENT

Figure 1:
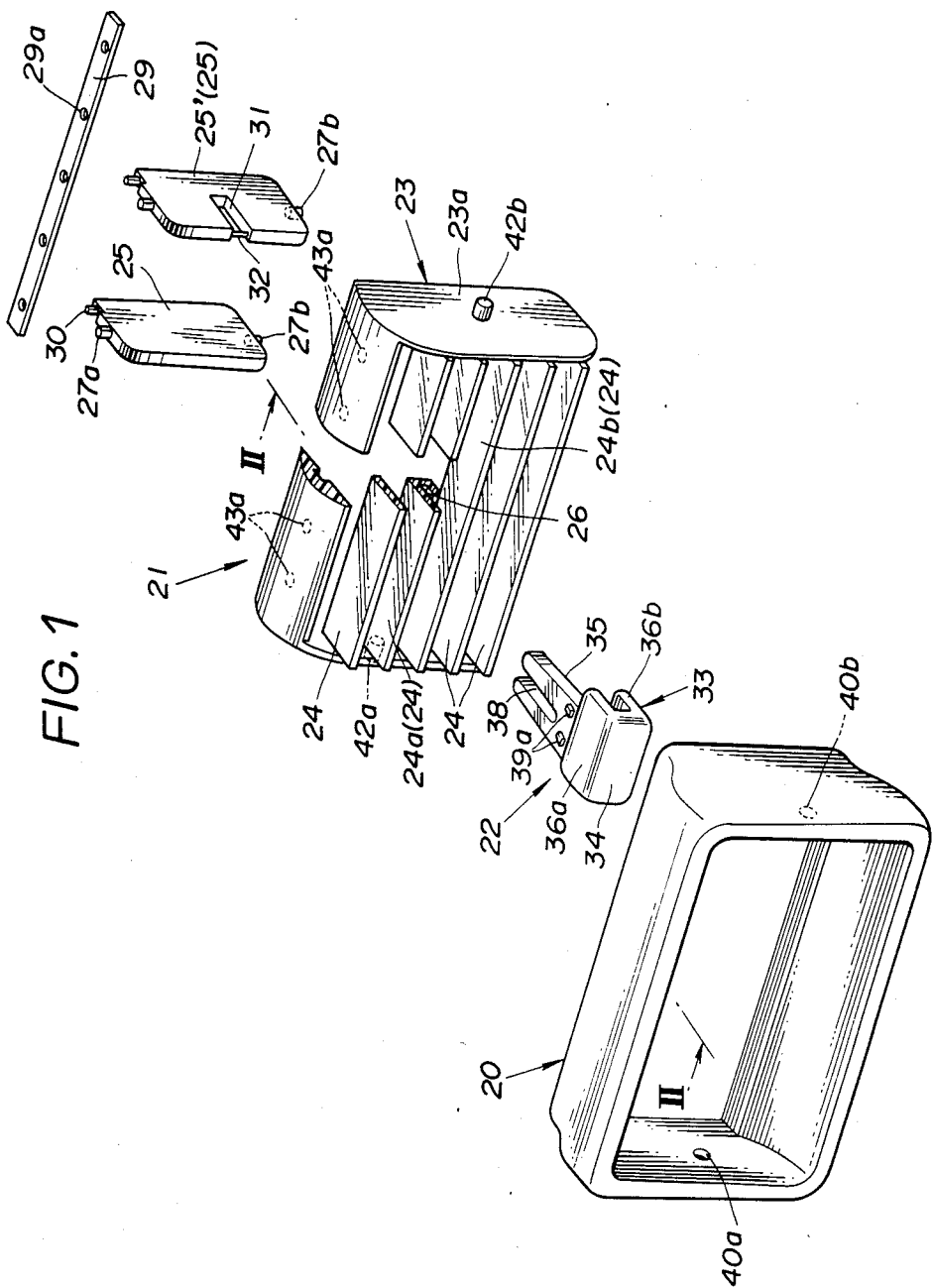
FIG. 1 is an exploded view of a ventilator nozzle structure of the present invention.
Figure 2:
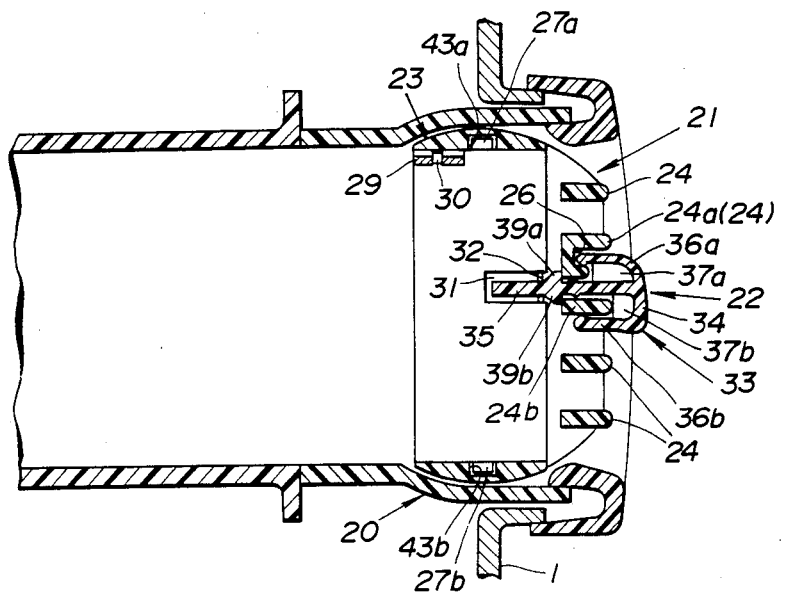
FIG. 2 is an assembled sectional view of the ventilator nozzle structure of FIG. 1, taken along a plane indicated by the line II—II of FIG. 1.
Figure 3:
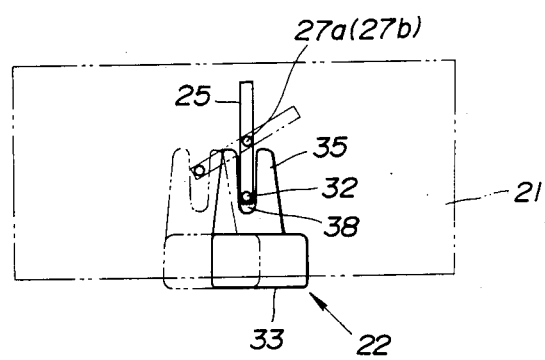
FIG. 3 is a plan view of a control knob and a movable fin employed in the ventilator nozzle structure of FIG. 1.
Figure 4:
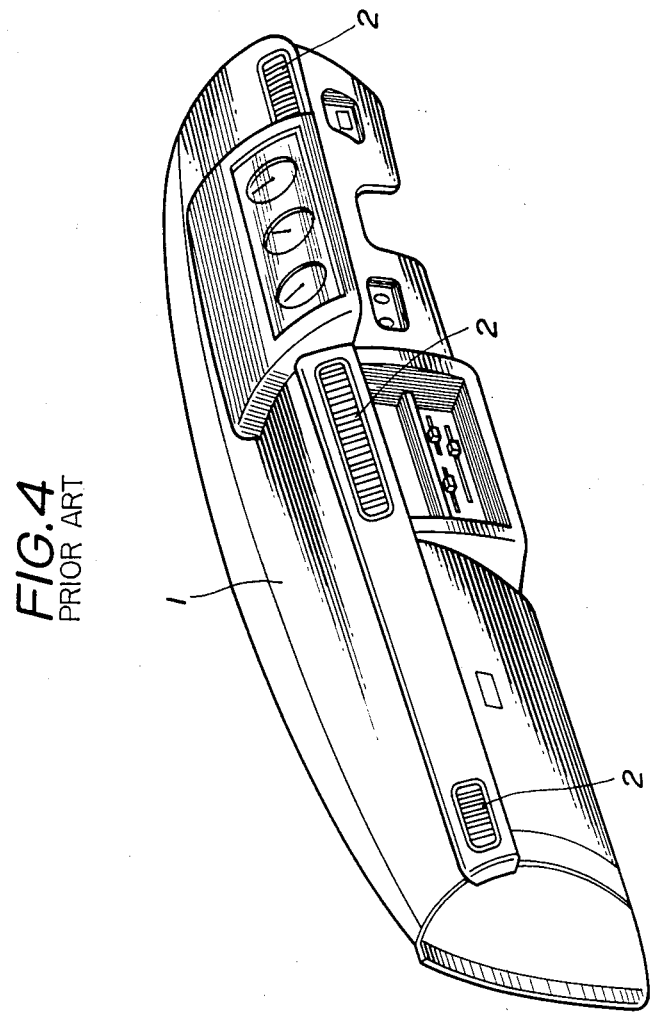
FIG. 4 is a perspective view of an automotive vehicle instrument panel having various ventilators with which the present invention is concerned.
Figure 5:
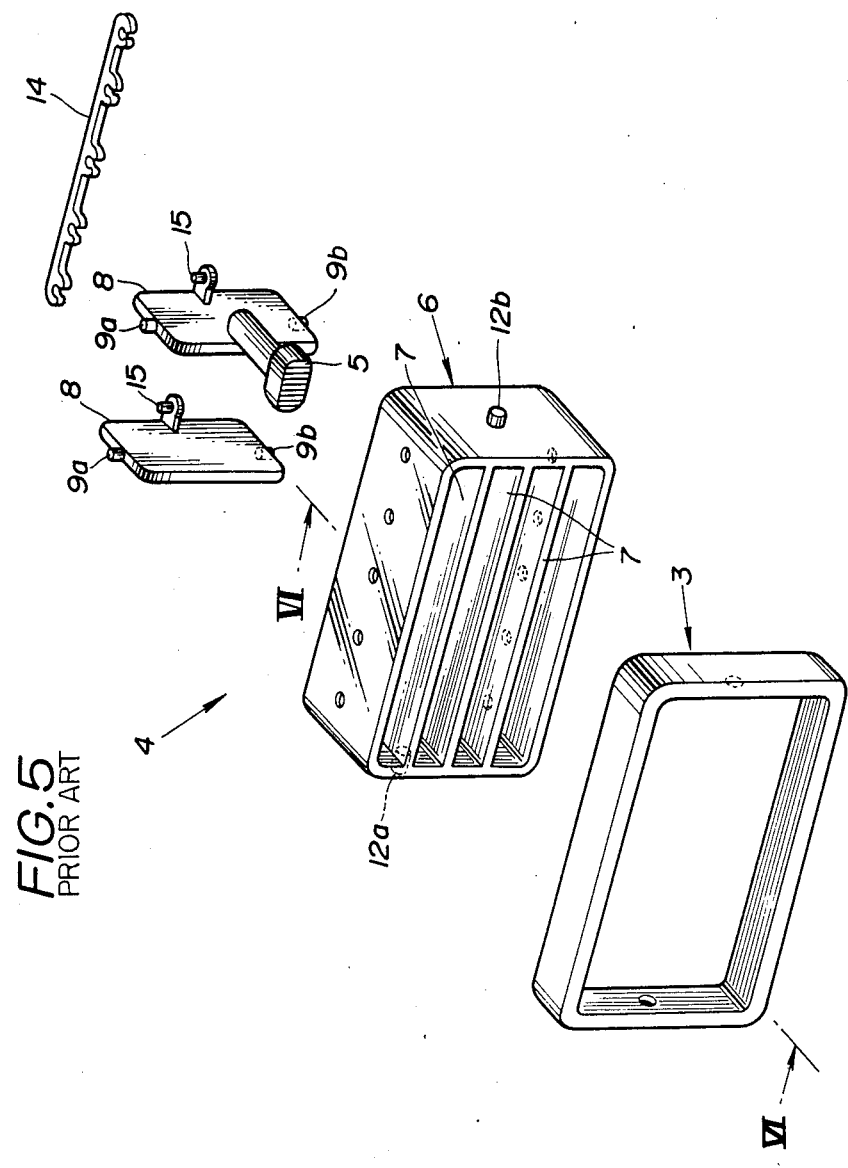
FIG. 5 is an exploded view of a prior art ventilator nozzle structure.
Figure 6:
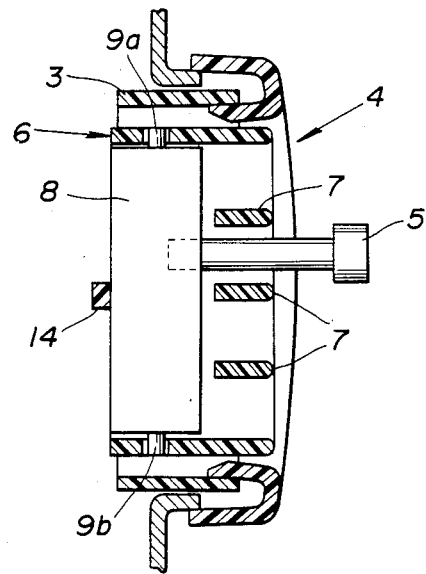
FIG. 6 is an assembled sectional view of the ventilator nozzle structure of FIG. 5, taken along a plane indicated by the line VI—VI of FIG. 5.
Figure 7:
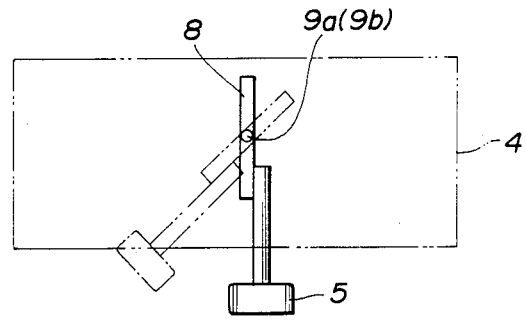
FIG. 7 is a plan view of a control knob and a movable fin employed in the ventilator nozzle structure of FIG. 5.

Referring to FIGS. 1 to 3, a ventilator nozzle structure of the present invention mainly consists of a housing 20 in the form of a rectangular frame and adapted to be fitted into a corresponding opening (not shown) formed in an instrument panel 1 (refer to FIG. 4), and a louver 21 rotatably mounted in the housing 20.

The louver 21 is box-shaped in configuration and consists of a louver main body 23 having a rectangular frame 23a and a plurality of horizontal parallel stationary fins 24 located at the front open end of the frame 23a, and a plurality of vertical parallel movable fins 25 (other than two are omitted in FIG. 1) located behind the stationary fins 24. The stationary fins 24 are integral with the frame 23a and have straight front edges. Of the stationary fins 24, the second fin 24a from the top is hook-shaped in cross section to have on the lower side thereof a slide groove 26 extending longitudinally thereof. The louver main body 23 has at the left and right side walls 41a, 41b thereof a pair of pivot shafts 42a, 42b which are inserted into openings 40a, 40b of the housing 20 so that it is rotatable upwardly and downwardly relative to the housing 20.

The movable fins 25 have at the upper and lower ends thereof pivot shafts 27a, 27b which are inserted into openings 43a, 43b formed in the upper and lower side walls 28a, 28b of the louver frame 23a so that the fins 25 are rotatable rightwardly and leftwardly relative to the louver main body 23. The movable fins 25 also have at the rear upper end portion thereof integral connecting pins 30 which are inserted into openings 29a of a connecting rod 29 so that rotation of one of the movable fins 25 causes all of other movable fins 25 to rotate about the pivot shafts 27a, 27b at the same time in the same direction. One 25' of the movable fins located adjacent the central part of the louver main body 23 is formed with a horizontally elongated, narrow cut 31 having an open longitudinal end at the front end of the fin 25' and has a slide pin 32 crossing the open longitudinal end of the cut 31.

A control knob is generally indicated by the reference numeral 23 and consist of a head portion 33 of a U-shaped cross section and having a front vertical wall 34 and upper and lower horizontal walls 36a, 36b interconnected at the front ends thereof by the front vertical wall 34, and a leg portion 35 extending from the rear surface of the front wall 34 horizontally rearward or toward the movable fin 25'. The leg portion 35 is so sized as to be movable in the cut 31 of the fin 25', i.e., the thickness of the leg portion 35 is smaller than the width of the cut 31. Between the upper wall 36a and the leg portion 35 and between the lower wall 36b and the leg portion 35 there are provided ribs 37a, 37b for reinforcing the control knob 22. Further, the leg portion 35 is bifurcated at the rear end portion thereof to have an elongated guide opening 38 extending longitudinally thereof and movably receiving therein the slide pin 32 so that the slide pin 32 and the guide opening 38 constitute a link means for linking the control knob 22 to the movable fin 25'. Further, the leg portion 35 has at the longitudinally central portion thereof and on the both upper and lower sides thereof locking projections 39a, 39b adapted to engage the rear ends of the second fin 24a and its adjacent lower fin 24b for preventing the control knob 22 from being slipped off after installation of the control knob 22 in place.

The control knob 22 is attached to the louver 21 through insertion from the front side of same, i.e., in installation of the control knob 22, the leg portion 35 is inserted into the aperture between the second stationary fin 24a and its adjacent lower stationary fin 24b in such a manner as to receive the slide pin 32 within the guide opening 38 thereof. The upper wall 36a of the head portion 33 is inserted at the rear free end portion thereof into the slide groove 26, while the lower wall 36b being brought into engagement with the lower surface of the stationary fin 24b to cooperate with the leg portion 35 to relatively movably hold therebetween the stationary fin 24b. The locking projections 39a, 39b are forced to pass through the aperture between the stationary fins 24a, 24b and brought into engagement with the rear ends of the stationary fins 24a, 24b for thereby preventing the control knob 22 from being slipped off from the louver 21.

With the above arrangement, by moving the control knob 22 arranged on the front side of the louver 21 upwardly and downwardly, the louver 21 can be bodily turned upwardly and downwardly relative to the housing 20. Further, as shown in FIG. 3, by moving the control knob 22 horizontally to the left and right, the head portion 33 is caused to move straightly leftward and rightward in parallel to the stationary fins 24 being guided by the slide groove 26 and the fins 24a, 24b. In this connection, when the control knob 22 is held at an intermediate position thereof, i.e., at a position intermediate between maximumly rightward and leftward displaced positions thereof, the slide pin 32 received in the guide opening 38 of the leg portion 35 is positioned adjacent the closed forward end of the guide opening 38. Movement of the control knob 22 to the left and right away from the intermediate position thereof causes the slide pin 32 to move toward the open rearward end of the opening, thereby causing the movable fins 25 to turn to the left and right away from the intermediate position thereof, i.e., a position intermediate between maximumly leftward and rightward turned positions thereof.

From the foregoing, it is to be understood that according to the present invention the amount which the control knob 22 is required to project from the louver 21 can be reduced since the projecting amount of the control knob 22 is constant irrespective of its movement to the left and right away from the intermediate position thereof.

It is further to be understood that according to the present invention movement of the control knob 22 can be smooth and reliable since the control knob 22 is guided by the adjacent two stationary fins 24a, 24b and the slide groove 26.

What is claimed is:

1. A ventilator nozzle structure comprising:
   a stationary housing;
   a louver rotatably mounted in said housing and having a louver main body and a plurality of movable parallel fins rotatably mounted in said louver main body and a plurality of stationary parallel fins disposed transverse to said movable fins;
   means for connecting the rovable fins such that rotation of one of the movable fins causes rotation of all other movable fins at the same time and in the same direction;
   a control knob having a head portion which is U-shaped in section and has a pair of parallel side walls and a wall connecting said side walls;
   one of said stationary fin being hook-shaped in cross section and having along one side thereof a slide groove extending longitudinally, said slide groove movably receiving a free end of one of the side walls of the head portion of said control knob, and means for connecting said control knob to said one movable fin such that movement of said control knob causes rotation on said one movable fin.

2. A ventilator nozzle structure as set forth in claim 1 in which said control knob has a leg portion bifurcated at its free end to define an elongated guide opening, said one movable fin being formed with an elongated, narrow cut and having a slide pin crossing an open end of said cut, said slide pin being movably received in said guide opening in such a manner that sliding movement of said control knob. causes said slide pin to move with said guide opening, said slide pin and said guide opening constituting said control knob connecting means.

3. A ventilator nozzle structure as set forth in claim 1 in which said control knob has a leg portion, said leg portion of said control knob passes through an aperture defined between said one stationary fin and another stationary fin immediately adjacent thereto on the slide groove side thereof, and in which the other of said side walls of said control knob cooperates with said leg portion to relatively movably hold therebetween said another stationary fin.

4. A ventilator nozzle structure as set forth in claim 3, in which said leg portion has on the opposite sides thereof projections abutting upon said one and another stationary fins to prevent said control knob from being slipped off from said louver.

* * * * *